US011984023B2

(12) United States Patent
McConnell

(10) Patent No.: US 11,984,023 B2
(45) Date of Patent: May 14, 2024

(54) TRAFFIC DISTURBANCES

(71) Applicant: Roderick Allen McConnell, Munich (DE)

(72) Inventor: Roderick Allen McConnell, Munich (DE)

( * ) Notice: Subject to any disclaimer, the term of this patent is extended or adjusted under 35 U.S.C. 154(b) by 47 days.

(21) Appl. No.: 16/752,668

(22) Filed: Jan. 26, 2020

(65) Prior Publication Data

US 2021/0233392 A1 Jul. 29, 2021

(51) Int. Cl.
*G08G 1/095* (2006.01)
*G08G 1/01* (2006.01)
*G08G 1/052* (2006.01)

(52) U.S. Cl.
CPC ......... *G08G 1/0145* (2013.01); *G08G 1/0133* (2013.01); *G08G 1/052* (2013.01)

(58) Field of Classification Search
CPC .... G08G 1/0145; G08G 1/052; G08G 1/0133; G08G 1/096775; G08G 1/0112
USPC .......................................................... 340/907
See application file for complete search history.

(56) References Cited

U.S. PATENT DOCUMENTS

| | | | | |
|---|---|---|---|---|
| 5,889,477 | A * | 3/1999 | Fastenrath | G08G 1/0104 340/905 |
| 11,249,480 | B2 * | 2/2022 | Meyer | G08G 1/09 |
| 11,270,591 | B2 * | 3/2022 | Amacker | G08G 1/0116 |
| 2010/0070253 | A1 * | 3/2010 | Hirata | G08G 1/0104 703/8 |
| 2013/0173153 | A1 * | 7/2013 | Hayashida | G08G 1/096811 701/527 |
| 2017/0076598 | A1 * | 3/2017 | Scofield | G08G 1/096725 |
| 2019/0088120 | A1 * | 3/2019 | Adireddy | G08G 1/0145 |
| 2019/0325750 | A1 * | 10/2019 | Bielby | G08G 1/162 |
| 2020/0019161 | A1 * | 1/2020 | Stenneth | G08G 1/166 |
| 2020/0035096 | A1 * | 1/2020 | Sun | G08G 1/082 |
| 2020/0111354 | A1 * | 4/2020 | Hofman | G08G 1/083 |
| 2020/0201353 | A1 * | 6/2020 | Martin | G01C 21/3415 |
| 2021/0012651 | A1 * | 1/2021 | Park | G08G 1/096775 |

* cited by examiner

*Primary Examiner* — Anh V La

(57) ABSTRACT

An example system learns from traffic disturbances or perturbations to improve overall traffic flow. The perturbations may be related to specific times such as morning rush hour, or for all times of day. The improvement to overall traffic flow may be measured by time lost in traffic delays, or by time of travel, or by risk of accidents.

20 Claims, 3 Drawing Sheets

TRAFFIC DISTURBANCES

BACKGROUND

Traffic flow can often be improved by improving the flow at specific problem spots. Mergers on highways, busy intersections, and construction sites are typical points at which traffic slow-downs and traffic jams occur. Sometimes it is possible to improve traffic flow at one point by throttling or controlling the flow at an earlier or "upstream" point, to e.g. slow down arriving traffic, create pulses in the flow of traffic, or encourage a portion of the traffic to use alternate routes.

The likelihood of accidents and the severity of accidents can also be affected by controlling the flow or speed of traffic. The risk of an accident where highways merge can sometimes be reduced by slowing down arriving traffic—or even by speeding up traffic on one of the two routes.

Modifying the flow of traffic has been performed with traffic signs that change depending on the traffic flow and volume. The speed limit on a highway may be reduced from 120 km/h to 60 km/h to slow traffic arriving at a traffic jam. Metering may be used, to slow down or limit the number of cars entering on a highway. The number of lanes may be reduced in anticipation of a merger of two highways or roadways, such that two 3-lane highways are first reduced to 2×2 lanes, and then merge into 1×4 lanes.

The instant disclosure presents a self-improving or self-learning traffic control system, such that perturbations at one point in the traffic flow which improve traffic flow at another point, are registered and re-used to continuously or permanently improve traffic flow. In another aspect of the instant invention, data sets for automated learning, or training sets for artificial intelligence systems, can be identified with limited or no annotation being necessary. Instead, observation of naturally occurring data sets can be used, together with specific criteria for identifying improvements, to do an automated annotation for traffic control.

Perturbations in traffic flow can be evaluated with different metrics to judge the improvement or lack of improvement of traffic flow. A metric of improvement might be achieved by measuring instant or average speed of vehicles, or by measuring the duration of travel time, as compared to the same metric without the traffic disturbance.

Traffic flow has to be tracked, and measures used to decide whether it is improved. Measures may include overall speed of vehicles, time lost by vehicles passing between two points, time lost in traffic delays or traffic jams, likelihood of accidents, severity of accidents, etc. An example comparison is between the measures with the traffic disturbance or perturbation, and the same measures without the perturbation.

The perturbations may be external (or natural) events, such as an accident or a road closure. Or the perturbations may be internal or experimental, generated in order to observe the effect they have on traffic flow. In a simplified form, the perturbations which improve overall traffic flow are kept, and those which hinder overall traffic flow are not kept. One advantage of perturbations is that they permit to observe the effect of changes in traffic flow which might otherwise never occur, or to try out traffic flow patterns which otherwise would not be tried. Thus, traffic perturbations or disturbances may provide inputs for self-learning systems, which would not otherwise be available.

Perturbations may include lowering the speed limit, closing a lane, metering a lane or route (e.g. a traffic light which spends more or less time in the green phase), or other ways of reducing or affecting the traffic flow on a certain route or on a lane of a multi-lane route.

An example system may be an artificial intelligence system. The system may learn from real-life observations, from simulations of traffic flow, or from a training set of traffic data, or any combination of these. The system may use measurements from perturbations to develop a training set. The system may learn by tracking all vehicles on a set of routes, or a representative subset of vehicles (every car with GPS tracking, every car with a mobile phone connection), or a random subset of vehicles (every car with an odd license number, every green car). A route may comprise one lane or multiple lanes of traffic flowing in the same direction. An example system may also create experimental perturbations such as a lane closing, and observe the effects on traffic delays. The example system may randomly create perturbations, or may create perturbations on one route which resemble perturbations on a different route that have been found to improve traffic flow. The perturbations may be for a specific period of day, or continuous perturbations for an entire day.

An example system may be able to identify violators of traffic regulations used to create perturbations. For example, a system may close a lane, and then identify vehicles which do not respect the lane closing or use a lane which is closed to traffic. A system may automatically issue fines or other punishments to vehicles or drivers which do not respect perturbations such as lane dosings. Often traffic patterns on a certain route depend on the time of day. Traffic delays may occur during morning rush hour, or both morning and evening rush hours, or on Saturdays during vacation periods. Traffic delays may occur near a stadium in connection with sports events. The traffic patterns on a route which carries traffic in both directions may have different characteristics in each of the two directions.

An example system may follow the time of day, the day of the week, whether the day is a holiday, etc. The example system may be "event aware", that it is aware of sports events at arenas, performances at theaters, etc. The example system may be aware of unexpected or irregularly occurring events such as rain or snow storms, or even emergency evacuations.

An example system may cooperate with autonomous vehicles. The autonomous vehicles may form all or part of the traffic or a portion of the vehicles. Some vehicles may be autonomous and others "classic" vehicles with a human driver. The autonomous vehicles may form a part of the traffic being 5% or 10% or 20% or roughly half, with the rest being driven vehicles. Autonomous vehicles may provide data to the system concerning the flow of traffic. The vehicles may provide information on travel time and time lost in traffic. An example system may determine that perturbations have different effects on traffic flow depending on the mix of autonomous and driven vehicles. It may determine that a lane of a highway arriving at a merger should be closed if driven vehicles are more than half of the traffic flow, and open if autonomous vehicles are more than half of the traffic flow.

An example system may use autonomous vehicles to perturb or control traffic flow. Autonomous vehicles may be used to slow vehicles arriving at a specific problem spot such as a spot where traffic jams occur. Autonomous vehicles may be used to at least partially regulate traffic flow at an intersection. Such vehicles may be used to encourage driven vehicles to change lanes or otherwise modify how driven vehicles are driven. The traffic control system may provide driving instructions to the autonomous vehicles in order to orchestrate or regulate or control traffic flow.

BRIEF DESCRIPTION OF THE FIGURES

The following figures show aspects of the inventive concept.

DETAILED DESCRIPTION

Figure 1:
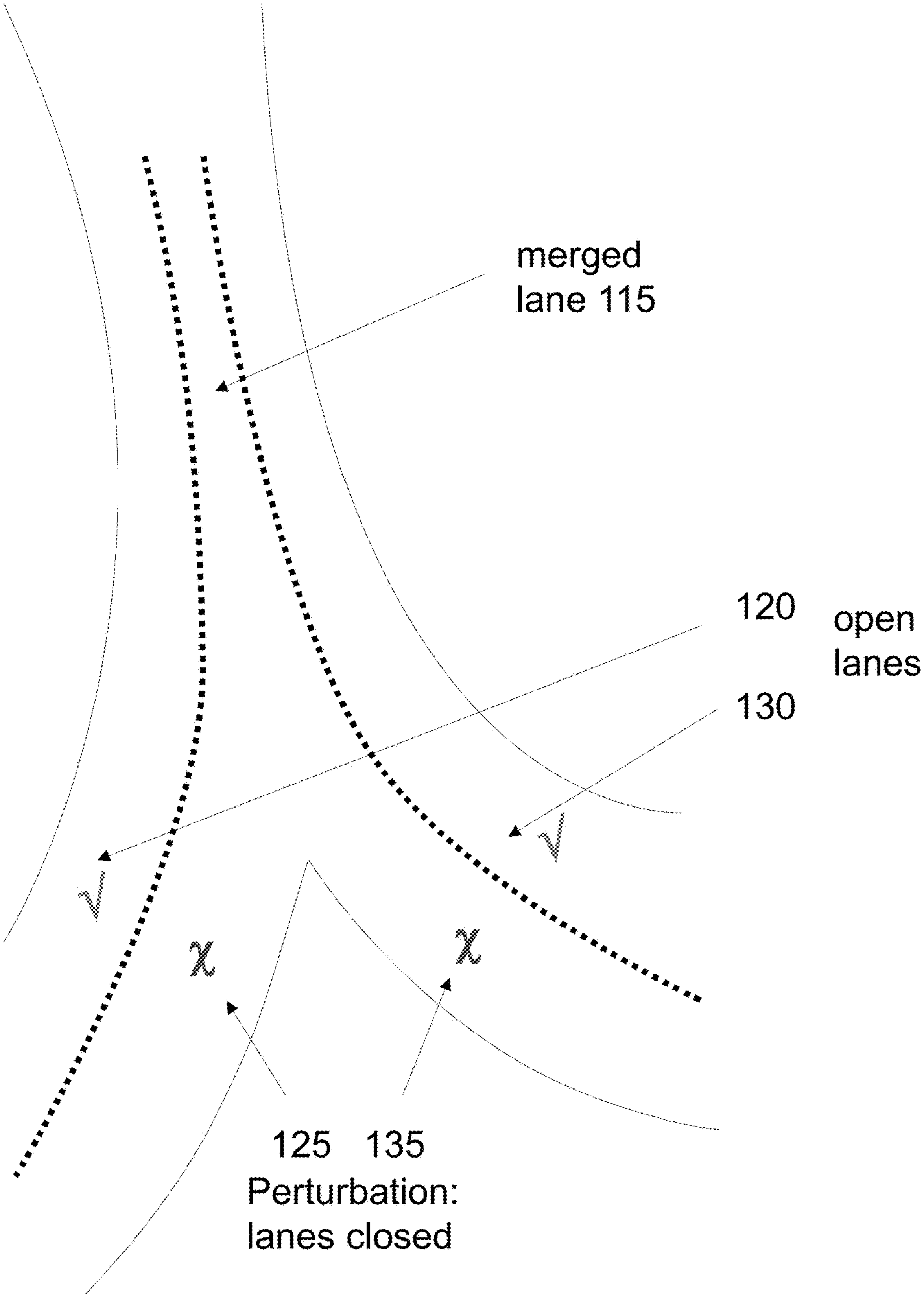
FIG. 1 shows a disturbance at a merger of two roadways.

FIG. 1 shows two highways 120, 130 of two lanes each 125, 135 which merge to a route of three lanes 115. A perturbation or disturbance may close the merging lane of each of the two highways. An example system may observe or collect traffic data concerning the change in traffic circulation by comparing the traffic flow when the merging lanes are open and when they are closed. Variations of the closings are also possible. The system may collect information about the speed of vehicles when both merging lanes are open, when one or the other is closed, and when both are closed. This information may be collected for different times of the day.

One embodiment of an inventive system may measure the throughput or volumetric flow of traffic with and without the disturbance of closing the lanes, i.e. the total number of vehicles per minute or hour. Another embodiment may measure the average time of travel for vehicles with and without the disturbance. The travel time may be measured from a starting point to a finish point, which may or may not be the same between different vehicles. Measuring the average travel time will include the influence of follow-on effects. For example, closing the lanes may reduce the average traffic speed where the two highways join, but may increase the average speed after the merge over a longer distance, and thereby enable shorter travel times overall or a higher volume overall. Traffic flow may also be measured using fuel or energy consumption as one of the metrics or as the unique metric. Energy consumption may be measured for traffic passing the perturbation, or for travel from one point to another, or for start-to-finish travel for the measured vehicles.

In embodiments of the system, vehicles participate to enable the self-improving operation. A vehicle may provide departure and arrival time information, and indications of, or information which can be used to identify, traffic perturbations along the route between departure and arrival. Ideally, this reporting is automated, and provided explicitly with a message from the vehicle of departure, of arrival, of a perturbation, so that the vehicle provides e.g. a starting point and a finish point to the traffic control system. The information may also be provided implicitly, that the participating vehicle departs or arrives. Perturbations can be identified implicitly, in that the vehicle does not travel its usual route. A participating vehicle may also provide fuel consumption or energy consumption information to the traffic control system.

In the example of FIG. 1, a disturbance might include closing just one lane 125, or just closing the other lane 135, or closing both.

The effect of a traffic perturbation may or may not be direct. Traffic flow for vehicles which do not pass the traffic perturbation may improve as traffic flow for vehicles which do pass the perturbation does not improve or even gets worse. Thus it may be that the overall improvement does not correspond to an improvement for every vehicle. Indeed it may be that the overall improvement is based on priorities or a weighting system, whereby traffic flow for commercial vehicles is given more importance, or traffic flow for public vehicles or public transport vehicles such as busses is given more weight. In one embodiment, a perturbation which improves the traffic flow for busses may be recorded for later use, whereas the same improvement in traffic flow for private vehicles such as cars would not be sufficient to be recorded for later use.

An example system may be a system which monitors and learns from the Munich middle ring road, a.k.a. Mittlere Ring. The system keeps track of a random subset of vehicles which have a mobile telecom connection while traveling counter-clockwise on the ring road. At the point where a certain highway arrives at the ring road, there is a traffic delay of ca. 10 min's time lost, both for vehicles arriving on the ring, and vehicles arriving on the highway. The time lost might be as compared to the theoretical fastest travel, or the fastest travel measured under conditions of no traffic.

One day there is construction on the highway leading to the ring road, causing one of two lanes to be closed. Traffic is slowed on the highway, but no extra waiting time beyond 10 min's occurs for vehicles on the highway. Traffic flows better on the ring road, such that there are ca. 5 min's of lost time instead of 10. The system measures and records this as an improvement: 5 min's less loss on the ring mad, and no change on the highway entering. As a follow-on step, the system may have the capacity to close one of the two lanes on the highway entering the ring road at the location where construction occurred. The system may do only at times when there are traffic delays on the ring road, or when the delays exceed a certain value, etc. In this case the measure or metric is travel time for vehicles passing a certain point, or alternatively the total travel time for measured vehicles.

Figure 2:
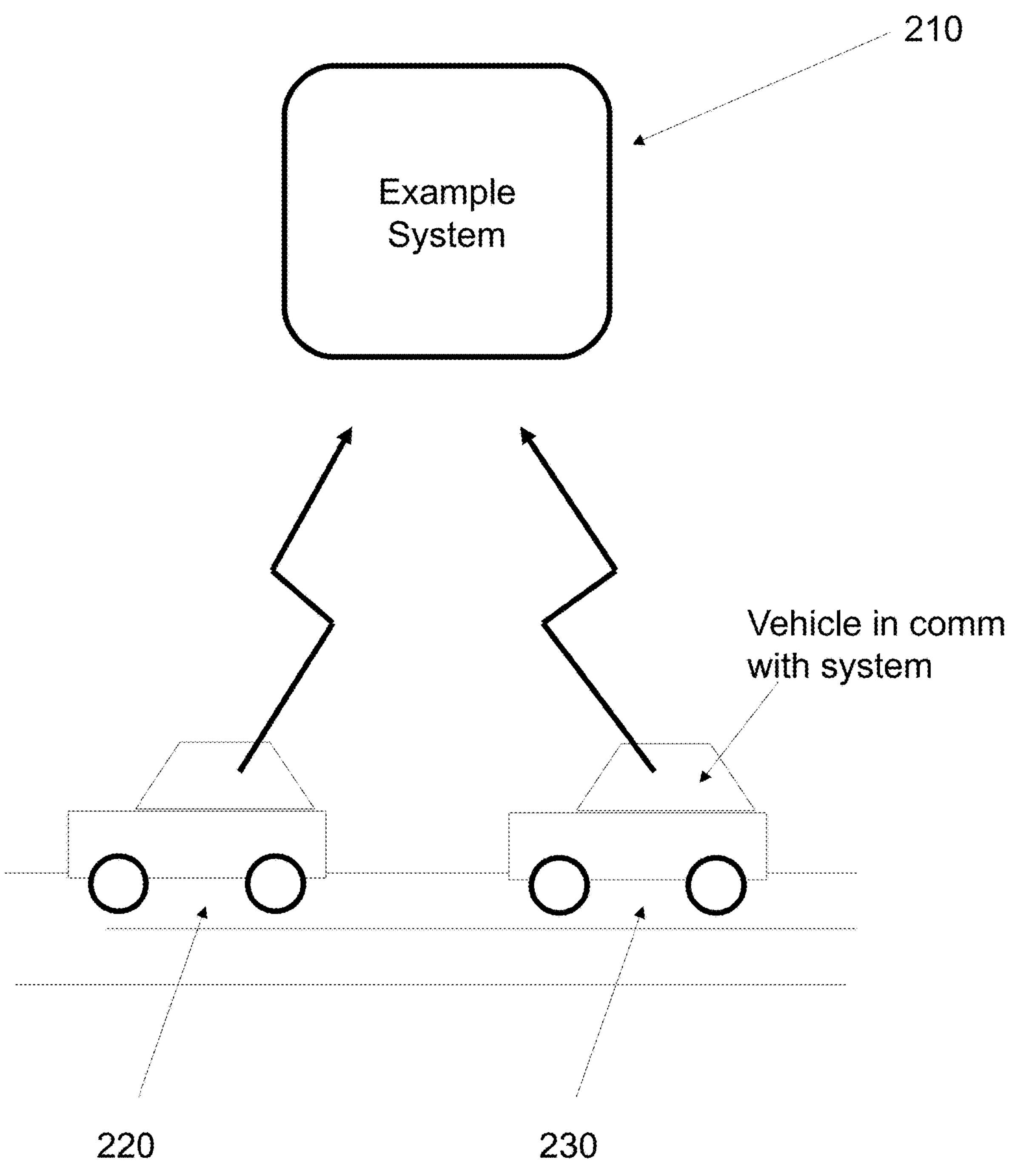
FIG. 2 shows vehicles communicating with a traffic control system.

FIG. 2 shows vehicles 220, 230 which might be used for the system described above. Both are in communication with a traffic control system 210, that collects information about how quickly the vehicles advance and which lane or lanes are open, etc. The participating vehicles which are in communication and connected to a traffic control system may represent a sampling of vehicles which are using the road. Or the connected vehicles may form a substantial portion of the vehicles using a given roadway, such as one quarter, or one half, or three quarters of the vehicle. In one embodiment, the connected vehicles may represent substantially all of the vehicles using a given roadway.

In the case of a system which uses autonomous vehicles to create traffic perturbations, a traffic control system may direct one or more vehicles to use an abnormal driving pattern to create a disturbance. In embodiments, the disturbance is for a limited time, as an experiment to see what effect the disturbance has on traffic flow, especially as measured by the metric which is to be used.

In example systems the traffic control system may provide the driving instructions to the autonomous vehicles in order to orchestrate or regulate or control traffic flow.

Figure 3:
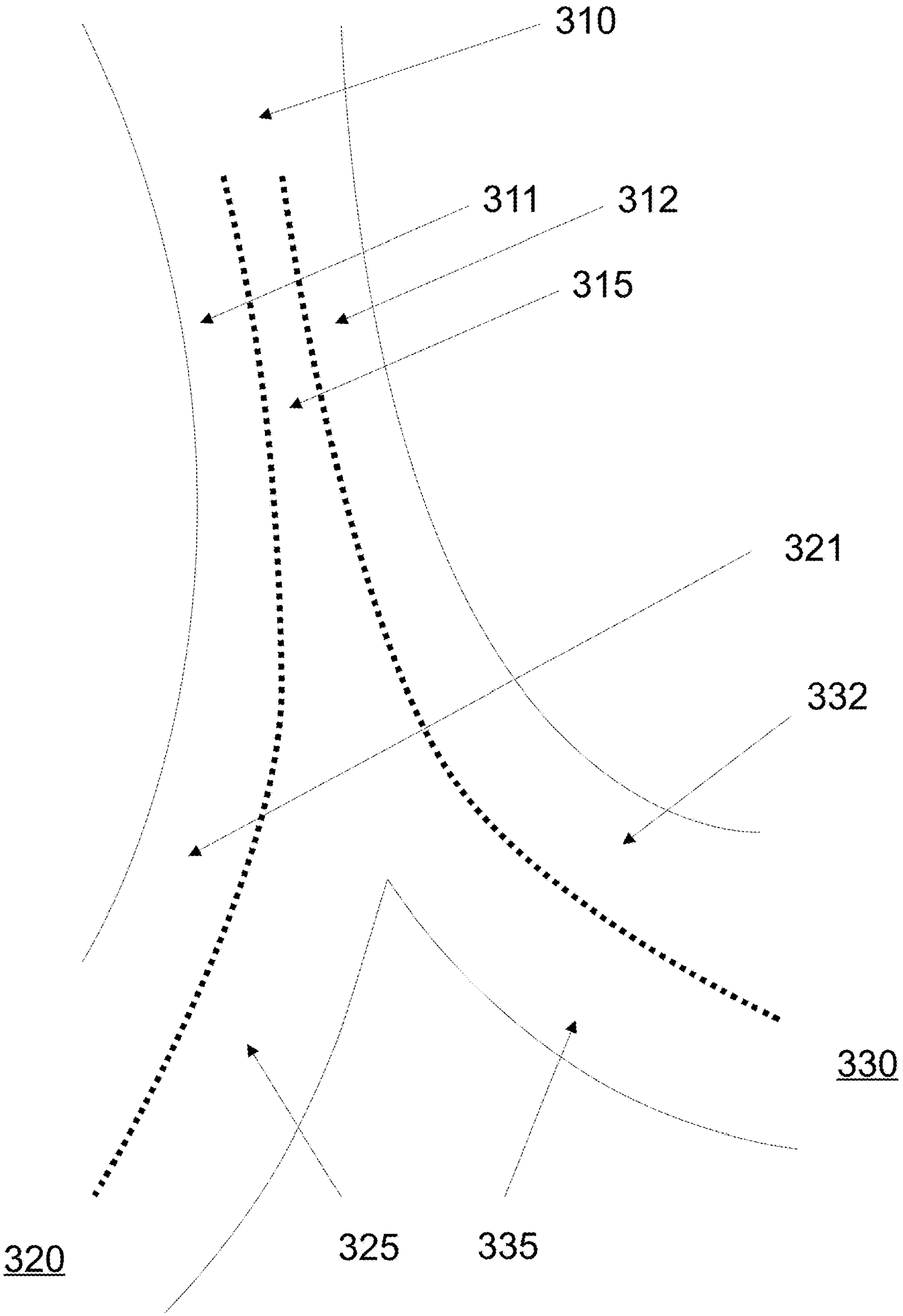
FIG. 3 shows an intersection of multi-lane roadways.

FIG. 3 shows an intersection of roadways 320, 330 which can serve as an example of the inventive concept. Vehicles arrive on one of two roadways in one of two lanes 321, 325, 332, 335. A perturbation on two of the four incoming lanes, as in the example of FIG. 1, may or may not improve traffic flow, as measured by the chosen metric. Other perturbations or traffic disturbances may also occur, or as in certain embodiments, may be created or provoked by the system.

Creating or provoking disturbances may permit an evaluation of the effect that those disturbances have on the traffic flow.

In one embodiment, the left lane 321 may be closed at some point in time to do roadwork. The traffic control system may determine that during rush hour, the total throughput of the two roadways increases, while during off-peak hours there is no change, and at night the average travel time increases. The system may take note of these changes as data indicating that the metric shows improved traffic flow during rush hour, no change off-peak, and worse results at night.

In embodiments, a participating vehicle may receive driving instructions from the traffic control system, or may create disturbances. In one embodiment, a traffic control system may direct one or more vehicles to drive more slowly than would normally be the case. For example, in one embodiment, in the case of a merger of two-lane highway as in FIG. 1, the traffic control system might direct multiple participating vehicles to move to the lanes which merge, such that other vehicles will tend to move to the outer lanes and not be in the merging lane. If this improves overall traffic flow, then it would be registered by the traffic control system as a perturbation which causes an improvement. The system may take note of these changes as data indicating that the metric shows an overall improvement.

In another embodiment, vehicles such as shown in FIG. 2 might be directed to drive more slowly in the merging right lane 325, such that other vehicles will tend to use the non-merging left lane 321, and the overall traffic flow may be improved. For example, if the metric is throughput as vehicles per hour, and causing slower traffic flow in the right-hand lane allows more vehicles per hour to use the highway, then the disturbance would be registered as an improvement. On the other hand, if the disturbance resulted in fewer vehicles per hour using the highway, then the disturbance would be registered as making the traffic flow worse.

In bigger cities, there may be multiple disturbances or perturbations in parallel. The traffic flow may measured in the presence of more than one perturbation. In certain embodiments, different perturbations or disturbances may occur in different combinations on different days. By observing and measuring the perturbations in different combinations, a traffic control system can benefit from a better overall information base. Thus, the determination of improvement can use a bigger database, which includes a determination based on measures in the presence of multiple perturbations. The resulting improvements benefit from information from multiple combinations which cause different effects—not all effects being easy to measure in isolation, but when taken in common the result is a better database for the improvement of traffic flow.

The experimental disturbances of some embodiments and their resulting measures may be combined with measures from non-experimental disturbances such as accidents, to create a larger database for the traffic control system. It may also happen that the measures of improvement or lack of improvement may be contradictory, and a perturbation, or disturbance in one place may lead to delays for certain trajectories and improvements for other trajectories. In certain embodiments, the improvements in measures for some trajectories, and the lack of improvement (or even the worsening of measures) for other trajectories, must be balanced and compared. In some embodiments, the measures must be compared and balanced using a metric for comparison. In one embodiment, the metric may be the sum of change in travel time, while in another embodiment, the metric may be the sum-of-squares of the change in travel time. Perturbations may also be combined and simulated to increase the size of the data set.

I claim:

1. A method of controlling traffic flow using at least one vehicle suited and adapted to participate in a self-improving traffic control system, whereby the at least one vehicle provides departure and arrival time information, and indications of, or information which can be used to identify, traffic perturbations along the route between departure and arrival, whereby the traffic flow to be controlled is measured with and without perturbations, and when a perturbation is determined to improve the traffic flow, the effect of the perturbation is recreated at a later time to improve traffic flow as compared to traffic flow without the perturbation, wherein perturbations are selected from the set consisting of an accident, a road closure, lowering a speed limit and closing a lane, and wherein perturbations which improve traffic flow are kept to be recreated at a later time, and the perturbations which hinder traffic flow are not kept.

2. The method of claim 1, wherein the measure comprises the average energy consumption of the vehicles, or the average speed of vehicles passing a certain point, or the average travel time between a starting point and a finishing point for vehicles.

3. The method of claim 1, wherein the traffic flow is measured in the presence of more than one perturbation.

4. The method of claim 1, wherein the determination of improvement comprises a determination based on measures of multiple perturbations.

5. The method of claim 1, wherein the determination of improvement includes a determination based on the type of vehicle concerned.

6. The method of claim 1, wherein the determination of improvement includes traffic flow measured for vehicles which do not pass the perturbation.

7. The method of claim 1, wherein autonomous vehicles are used to perturb or control traffic flow.

8. The method of claim 1, wherein the perturbations to be recreated at a later time include lowering the speed limit, closing a lane, or metering a lane or route with a traffic light which spends more or less time in the green phase.

9. A traffic control system which learns from traffic perturbations, wherein the traffic control system is in communication with at least one vehicle suited and adapted to participate in a self-improving traffic control system, whereby the vehicle is suited to provide departure and arrival time information, and indications of, or information which can be used to identify, traffic perturbations along the route between departure and arrival, wherein perturbations are selected from the set consisting of an accident, a road closure, lowering a speed limit and closing a lane, wherein the traffic flow is measured with and without perturbations, and wherein the effect of perturbations which improve-traffic flow is kept to be recreated at a later time, and perturbations which hinder traffic flow are not kept.

10. The system of claim 9 which creates traffic perturbations to improve traffic flow.

11. The system of claim 9, wherein the system learns from perturbations which are events it creates or from perturbations which are naturally occurring events.

12. The system of claim 9, wherein the system measures the travel time of vehicles from a starting point to a finish point, or the average speed of vehicles passing a certain point, or the average time lost by vehicles passing a certain point.

13. The system of claim 9, wherein the system measures the energy consumption of vehicles passing a certain point, or over a certain distance, or from a starting point to a finish point.

14. The system of claim 9, wherein autonomous vehicles are used to perturb or control traffic flow.

15. The system of claim 9, wherein the perturbations to be recreated at a later time include lowering the speed limit, closing a lane, or metering a lane or route with a traffic light which spends more or less time in the green phase.

16. A vehicle suited and adapted to participate in a self-improving traffic control system, whereby the vehicle is suited to provide departure and arrival time information, and indications of, or information which can be used to identify, traffic perturbations along the route between departure and arrival, whereby traffic perturbations are selected from the set consisting of an accident, a road closure, lowering a speed limit and closing a lane, wherein the traffic flow is measured with and without perturbations, whereby the effect of perturbations which improve overall traffic flow is kept to be recreated at a later time, and the perturbations which hinder overall traffic flow are not kept.

17. The vehicle of claim 16 wherein the vehicle provides information about a starting point and a finish point to the traffic control system.

18. The vehicle of claim 16, wherein the vehicle creates perturbations.

19. The vehicle of claim 16 wherein the vehicle provides fuel consumption or energy consumption information to the traffic control system.

20. The vehicle of claim 16 wherein the vehicle receives driving instructions from the traffic control system.

* * * * *